March 28, 1939.  L. E. LA BRIE  2,152,067
BRAKE
Original Filed Nov. 22, 1930   2 Sheets-Sheet 1

INVENTOR
LUDGER E. LaBRIE
BY Jerome R. Cox
ATTORNEY.

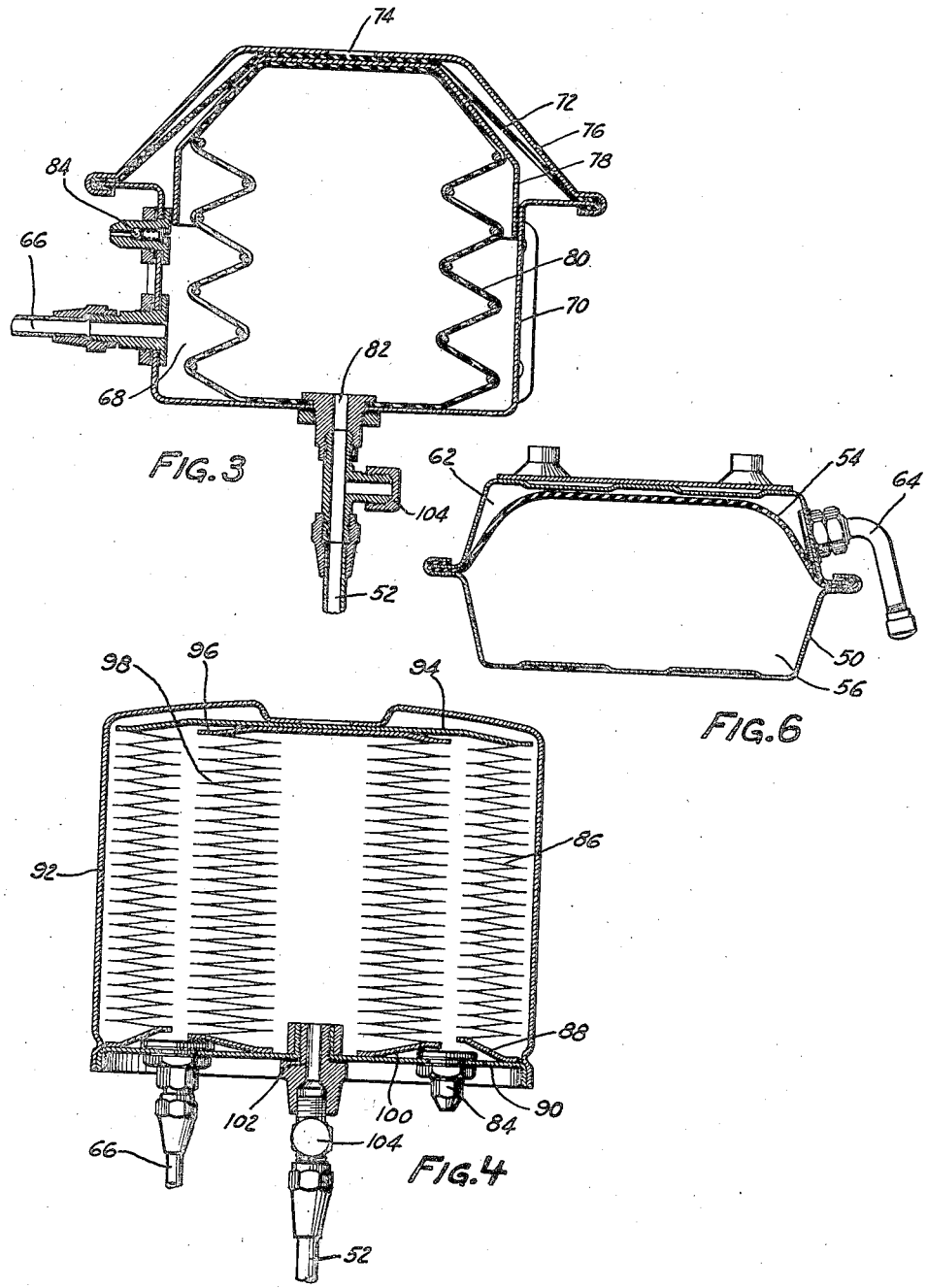

Patented Mar. 28, 1939

2,152,067

UNITED STATES PATENT OFFICE 2,152,067

BRAKE

Ludger E. La Brie, Detroit, Mich., assignor to Bendix Brake Company, South Bend, Ind., a corporation of Illinois Original application November 22, 1930, Serial No. 497,383. Divided and this application May 4, 1936, Serial No. 77,733

8 Claims. (Cl. 188—152)

This invention relates to fluid reservoirs and is illustrated as a reservoir embodied in a system of hydraulic brakes for automobiles. One feature of the invention relates to means for the development of air pressure for applying pressure to liquid in such a reservoir.

Various desirable and illustrative arrangements are shown for keeping the liquid in the reservoir under pressure and various features of novelty relate to these particular arrangements. Some of them utilize compressed air as a pressure medium and others utilize vacuum, for example the suction of the intake manifold of an engine, to supply air pressure on the liquid.

The above and other objects and features of the invention including various novel and desirable details of construction will be apparent from the following description of the illustrative embodiments shown in the accompanying drawings, in which:

Figure 3 is a section through the liquid reservoir of the hydraulic system of Figure 1;

Figure 1:
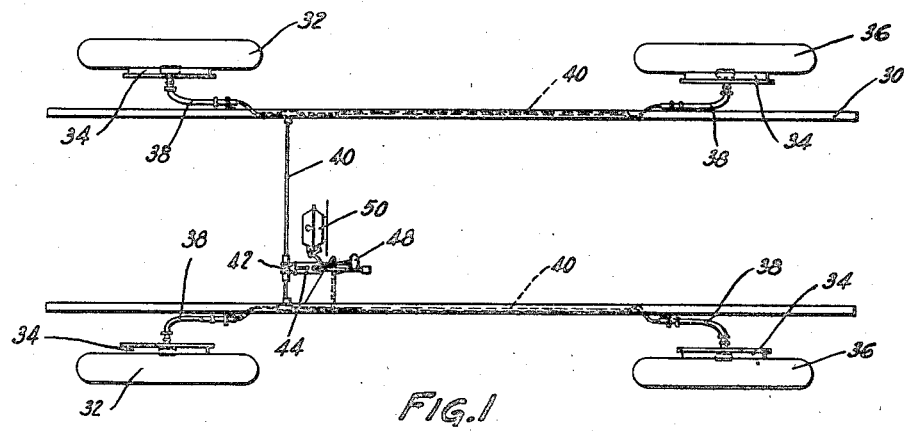
Figure 1 is a top plan view of an automobile chassis showing the arrangements of the parts of a system of hydraulic brakes.
Figure 2:
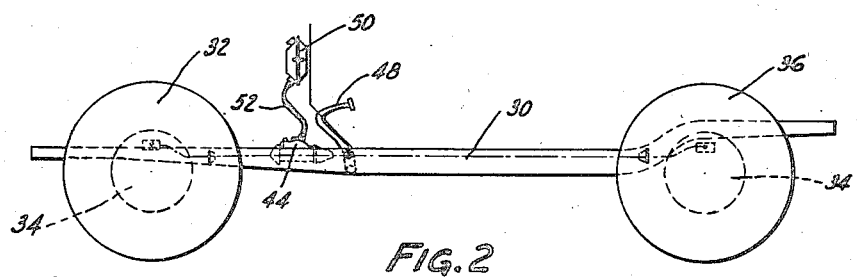
Figure 2 is a side elevation of the chassis shown in Figure 1.
Figure 5:
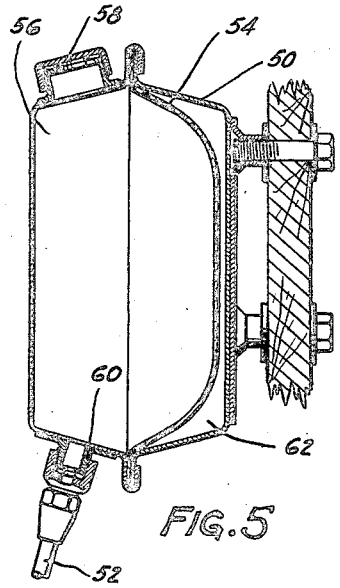

Figure 4 is a corresponding section through a different form of liquid reservoir; and Figures 5 and 6 are sections at right angles to each other through the particular form of liquid reservoir which is illustrated in Figures 1 and 2 and which in some respects is equivalent to those shown in Figures 3 and 4.

The chassis shown in Figures 1 and 2 includes the usual chassis frame 30 supported by the usual springs on front and rear axles (not shown) carried by front wheels 32 having brakes indicated generally at 34 and on rear wheels 36 having brakes also indicated generally at 34.

The brakes are intended to be operated by a hydraulic system including flexible hose connections 38 adjacent the four wheels and communicating by suitable pipe 40 carried by the chassis frame 30 with the outlet 42 of a master cylinder assembly 44 which may contain an operating piston connected with the usual brake pedal 46. The hydraulic system is kept full of liquid by means of a reservoir 50 which may be of one of the forms shown in Figures 3, 4, 5 or 6 and which is mounted on the dash above the master cylinder and on the opposite side of the dash from the driver. The reservoir 50 is connected to the master cylinder 44 by means such as a flexible conduit 52.

The form of reservoir shown in Figures 5 and 6 and which is shown for convenience diagrammatically in Figures 1 and 2 includes a stamped steel container divided vertically into two parts by a flexible diaphragm 54, which may be made of rubberized fabric or other flexible material which will not be affected by the liquid used in the hydraulic system. The part 56 to the left of the diaphragm in Figure 5 contains the reserve supply of liquid, which may be introduced through a filler cap 58 and is formed with an outlet 60 to which the conduit 52 is attached. The part 62 to the right of the diaphragm in Figure 5 is provided with means such as an ordinary tire valve 64 so that it may be filled with compressed air from a tire pump or from the usual air line found in filling stations and garages. It is intended that a pressure of some ten pounds be carried in the space 62, this being just sufficient to insure that the entire hydraulic system is at all times under a pressure sufficient to prevent any sucking in of air and which is yet light enough so that it does not actually apply the brakes.

As shown in Figure 3, instead of the compressed air pressure utilized in Figures 5 and 6, I may provide a connection 66 from the intake manifold of the engine which maintains a partial vacuum in the space 68 in the lower part of a reservoir housing 70 below a diaphragm 72 upon which the atmospheric air may act through an opening 74 in the cover 76. Preferably, the diaphragm 72 acts on the liquid by means such as a cap 78 forming a sort of piston adapted to compress a flexible bag or auxiliary diaphragm device 80 within which the liquid is contained and which communicates through an outlet 82 to the conduit 52. By this arrangement the vacuum of the intake manifold maintains air pressure through the opening 74 on liquid serving as before to keep a light pressure of some ten pounds on the hydraulic system. In order to prevent undue pressure being built up, I may provide an inwardly opening check valve 84 for the space 68 which is held by a spring having such a tension that the valve will open when the pressure in the space 68 drops below the critical predetermined limit.

In the arrangement of Figure 4, the connection 66 from the intake manifold opens into a flexible corrugated metallic diaphragm 86 which is cup-shaped in form and which is secured at its lower mouth to a stamping 88 secured to the cap 90 closing the lower end of an external housing 92. The upper end of the corrugated cup-shaped diaphragm 86 is secured to a base stamping 94 which urges downwardly a corresponding base 96 closing the upper end of a similar corrugated metallic diaphragm 98 which contains a reserve supply of liquid and the mouth of which is closed by a stamping 100 secured to the cap 90. The liquid inside the cup-shaped diaphragm 98 communicates with the conduit 52 through an outlet 102.

Both the containers 80 and 98 may be filled by providing a suitable filler spout 104 with a removable cap.

While a number of illustrative embodiments of the invention have been described in detail, it is not my intention to limit its scope to these particular embodiments, or otherwise than by the terms of the appended claims.

This application is a division of my copending application Serial No. 497,383, filed November 22, 1930, now Patent No. 2,095,752, dated October 12, 1937.

I claim:

1. A brake system comprising hydraulic brake-operating connections, a source of fluid pressure, and a reservoir containing coaxial corrugated metal diaphragms one positioned within the other, the inner one containing liquid and communicating with said connection whenever the brakes are released, and the outer one continuously in communication with said source and arranged to exert air pressure on the inner one when the brakes are released.

2. A brake system comprising hydraulic brake-operating connections, a source of fluid pressure, a reservoir containing coaxial corrugated metal diaphragms one positioned within the other, the inner one comprising a fluid tight container for liquid entirely sealed from the outer container and communicating with said connections when the brakes are released, and the outer one continuously in communication with said source and arranged to exert air pressure on the inner one when the brakes are released, and means actuated by said source for drawing air from the outer metal diaphragm for exerting air pressure on the inner diaphragm.

3. A brake system reservoir comprising a metal container having a vent to the atmosphere, a flexible corrugated metal diaphragm within said container, means for connecting a source of suction with the interior of said diaphragm, and an inner flexible corrugated metal diaphragm within the first named diaphragm, entirely sealed therefrom, and adapted to contain liquid to be used in the operation of the brakes.

4. A brake system reservoir comprising a metal container having a vent to the atmosphere, a flexible corrugated metal diaphragm within said container, means for connecting a source of suction with the interior of said diaphragm, a pressure limiting check valve for said diaphragm, an inner flexible corrugated metal diaphragm within the first named diaphragm, entirely sealed therefrom and from said source of suction, and means for supplying liquid to said inner diaphragm to be used in the operation of the brakes.

5. In a hydraulic brake system having a master cylinder, conduits and wheel cylinders, a reservoir for brake fluid comprising a metal container, a flexible diaphragm dividing said container, means for filling the container on one side of the diaphragm with fluid for the brake system, means for conducting the fluid to the master cylinder of the brake system, and means for exerting air pressure on the other side of the diaphragm, all so constructed and arranged to maintain a pressure in the wheel cylinders when the brakes are released.

6. In a hydralic brake system having a master cylinder, conduits and wheel cylinders, a reservoir for brake fluid comprising a metal container, a flexible diaphragm dividing said container, means for filling the container on one side of the diaphragm with fluid for the brake system, means for conducting the fluid to the master cylinder of the brake system, and means for exerting air pressure on the other side of the diaphragm said last-named means comprising a second diaphragm coaxial with and surrounding the first, and means for connecting one side of the second diaphragm to a source of suction, said metal container being formed with a vent on the other side of the second diaphragm, all so constructed and arranged to maintain a pressure in the wheel cylinders when the brakes are released.

7. In a hydraulic brake system having a master cylinder, conduits and wheel cylinders, a reservoir for brake fluid comprising a metal container, a flexible diaphragm dividing said container, means for filling the container on one side of the diaphragm with fluid for the brake system, means for conducting the fluid to the master cylinder of the brake system, and means for exerting air pressure on the other side of the diaphragm, said last named means comprising a second diaphragm coaxial with and surrounding the first, means for connecting one side of the second diaphragm to a source of suction, said metal container being formed with a vent on the other side of the second diaphragm and with a vent on said one side of the second diaphragm having an inwardly opening spring closed valve, all so constructed and arranged to maintain a pressure in the wheel cylinders when the brakes are released.

8. In a hydraulic brake system having a master cylinder, conduits and wheel cylinders, a reservoir for brake fluid comprising a metal container, a flexible diaphragm dividing said container, means for filling the container on one side of the diaphragm with fluid for the brake system, means for conducting the fluid to the master cylinder of the brake system, and means for exerting air pressure on the other side of the diaphragm, said last-named means comprising a threaded stem containing a check valve through which air may be pumped, all so constructed and arranged to maintain a pressure in the wheel cylinders when the brakes are released.

LUDGER E. LA BRIE.